United States Patent Office 2,896,465
Patented July 28, 1959

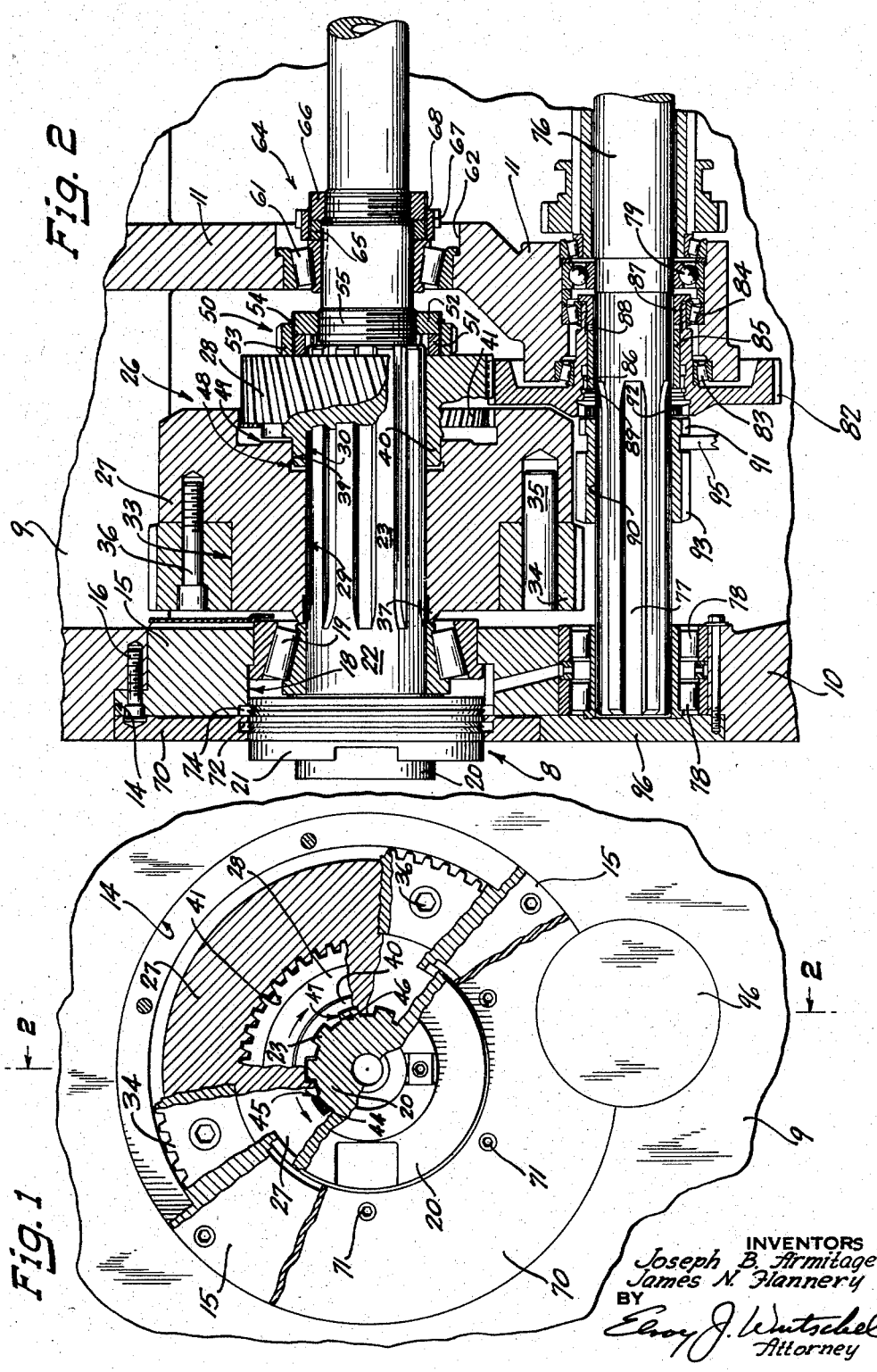

2,896,465

BACKLASH ELIMINATOR

Joseph B. Armitage, Milwaukee, and James N. Flannery, West Allis, Wis., assignors to Kearney & Trecker Corporation, West Allis, Wis., a corporation of Wisconsin Application June 13, 1955, Serial No. 515,052

10 Claims. (Cl. 74—409)

This invention relates generally to machine tools and more particularly to an improved backlash eliminator for retaining a flywheel in engagement with the rotatably journalled tool spindle of a machine tool.

Although the use of flywheels on machine tool spindles has many advantages, the proper mounting of a flywheel on a tool spindle has presented many problems. To begin with, a flywheel must be secured to a tool spindle in lash-free engagement in order to provide maximum effectiveness in performing machining operations. Heretofore, to accomplish this lash-free engagement, it has been customary to provide some kind of wedging action between the flywheel and the spindle. The wedging action has in some cases been accomplished by providing an axial taper on a portion of the spindle adapted to receive a complementary tapered bore in the flywheel, which was forced thereon and keyed to the spindle as well. While this arrangement operated to prevent lash between the flywheel and the spindle, it greatly increased the difficulty of disassembly as well as the replacement of the spindle bearings. Likewise, since it was customary to position the flywheel at the extreme rearward end of the tool spindle, it was usually necessary to disassemble the flywheel from the tool spindle before the tool spindle could be removed from the machine. On the other hand, in the event the flywheel was splined to the tool spindle to facilitate assembly, the almost imperceptible lash between the flywheel and the tool spindle created excessive vibration and chatter during operation. Such vibration not only created objectionable noise during machine operations, but likewise could impair the finish of a workpiece being operated on by a cutter mounted in the tool spindle. This arrangement likewise precluded removal of the tool spindle from the machine until after the flywheel had been disassembled from the tool spindle.

The principal object of the present invention is to provide an improved, simplified backlash eliminator for facilitating the assembly of a flywheel to a machine tool spindle.

Another object of the invention is to provide an improved backlash eliminator for completely eliminating lash between cooperatively intermeshing parts that are splined together.

Another object of the invention is to provide an improved mounting arrangement for removably securing a flywheel to a rotatable machine tool spindle.

Another object is to provide an improved unitary tool spindle assembly for a machine tool.

A further object of the invention is to provide a unitary tool spindle assembly including driving mechanism secured thereto in lash-free engagement, together with a cooperating supporting frame adapted to removably receive the unitary tool spindle assembly.

A further object of the invention is to provide an improved unitary tool spindle assembly particularly adapted to facilitate the assembly and disassembly of a tool spindle in a machine tool.

A further object is to provide an improved driving mechanism for a machine tool spindle.

A still further object is to provide an improved mounting arrangement for a machine tool spindle that is adapted to facilitate disassembly of the spindle and its associated driving mechanism from a cooperatively disposed supporting frame.

According to this invention, a machine tool of the horizontal spindle type is provided with an improved tool spindle assembly comprising a tool spindle, a forward bearing carrier, a forward spindle bearing and associated spindle driving mechanism that is operatively assembled into a machine tool frame as a single unit. The driving mechanism comprises a flywheel incorporating a large diameter low speed driving gear, and a high speed spiral driving gear that are removably splined to the spindle rearwardly of the forward spindle bearing. Approximately one-fourth the width of the spiral driving gear is disposed to be axially engageable with complementary internal spiral gear teeth constituting an internal spiral gear recessed into an adjacent end face of the flywheel. During initial assembly, a single adjustable lock-nut threaded on the spindle operates to urge the spiral driving gear axially along the splined spindle into tight meshing engagement with the internal spiral gear formed in the flywheel, with the opposite face of the flywheel abutting the inner race of the forward spindle bearing that is encircled by the bearing carrier. The axial engagement of the cooperating spiral gears respectively formed on the flywheel and associated driving gear effects a slight relative rotation of these members to clamp them securely to the splined portion of the spindle in lash-free engagement therewith. For receiving the machine tool spindle assembly as a single unitary structure, there is provided a machine tool frame having a front wall and a spaced apart interior wall respectively provided with axially aligned openings. The tool spindle assembly is axially insertable within the aligned openings provided in the walls in the frame with the bearing carrier removably secured within the opening formed in the front wall, and the central portion of the spindle rotatably journalled in a bearing carried by the interior wall. A second lock-nut threaded on the central portion of the spindle, rearwardly of the interior wall, is engageable with the inner race of the middle spindle bearing to retain the spindle in rotatable engagement with the spindle bearings.

The foregoing and other objects of this invention which will become more fully apparent from the following detailed description, may be achieved by the particular machine tool spindle structure depicted in and described in connection with the accompanying drawings, in which:

Figure 1 is a fragmentary view, partly in front elevation, and partly in transverse horizontal section of a tool spindle assembly incorporating the invention in combination with a portion of the supporting frame, and with parts broken away to show the anti-backlash device for the driving gears; and, Fig. 2 is another fragmentary view taken in longitudinal vertical section along the lines 2—2 in Fig. 1, and showing the improved tool spindle assembly and a portion of its cooperatively associated supporting frame.

The improved unitary tool spindle assembly and anti-backlash device shown in Figs. 1 and 2 as exemplifying a preferred embodiment of the invention, is particularly adapted to be utilized in a machine tool, for example, in a machine tool such as the horizontal spindle type milling machine disclosed in U.S. Patent No. 2,497,842 to Armitage et al., entitled Machine Tool Transmission and Control Mechanism, which issued on February 14, 1950. Although the invention is adapted to have particular utility in machine tools, it is to be understood that the various novel features of the invention may be incorporated in and utilized to advantage in structure of different construction that can be used with equal advantage in other types of machines.

Referring more specifically to the drawings, the unitary machine tool spindle assembly 8, shown in Fig. 2 thereof, is operatively mounted in a machine tool column or frame 9 such, for example, as the horizontal spindle milling machine column shown in the aforementioned Patent No. 2,497,842. The machine tool column 9, shown in fragmentary form, Fig. 2, is provided with a vertically upstanding front column wall 10, as well as a rearwardly spaced interior column wall 11 extending transversely between the opposite sides of the column in substantial parallelism with the front wall 10.

In order to removably receive the unitary tool spindle assembly 8, the front wall 10 of the column 9 is provided with an enlarged flanged opening 14 adapted to receive a flanged bearing carrier 15 of complementary shape that is removably secured to the wall 10 by means of cap screws 16. The bearing carrier 15, constituting the supporting element for the front portion of the tool spindle assembly 8, is in turn provided with a flanged circular opening 18 adapted to receive and carry the complementary flanged outer race of a front spindle bearing 19. The arrangement is such that with the bearing carrier 15 secured to the front column wall, as shown in Fig. 2, the outer race of the front spindle bearing 19 is constrained against rearward movement. The bearing 19 is adapted to rotatably support the forward portion of a tool spindle 20 that is provided at its forward end with the usual outwardly extending, enlarged circular flange 21. The portion of the spindle 20, together with the circular flange 21 extending forwardly of the column wall 10, constitutes the tool carrying end of the spindle, and is adapted to receive a cutting tool, such as a milling cutter (not shown) that may be removably secured thereto in well known manner.

Rearwardly of the flange 21, the tool spindle 20 is provided with a shoulder 22 upon which is mounted the inner race of the front spindle bearing 19, the front face of the inner race of the bearing 19 being maintained in tight abutting engagement with the rearward face of the spindle flange 21. The tool spindle 20 is likewise provided, rearwardly of the shoulder 22, with a plurality of circumferentially spaced, longitudinally extending driving splines 23, having splined engagement with a spindle driving assembly 26. The spindle driving assembly 26 comprises a flywheel 27 of a large diameter, and a cooperatively associated high speed, spiral spindle driving gear 28 of smaller diameter. It will be apparent that the gear 28 is provided with gear teeth that are formed angularly to a plane passing through the rotational axis thereof. Both the flywheel 27 and the cooperating spiral gear 28 are provided with bored openings presenting internally formed, longitudinally extending splines 29 and 30 respectively, that are complementary to the driving splines 23 formed on the tool spindle 20.

In spite of the splined engagement between the spindle driving assembly 26 and the tool spindle 20, a certain minimum clearance is required between the external spindle splines 23 and the internal splines 29 and 30 respectively presented by the flywheel 27 and the spiral driving gear 28. The minimum clearance between the cooperating splined parts is required to facilitate assembly and disassembly of the flywheel 27 and the spiral driving gear 28 on the splined portion of the tool spindle 20. During rotational operation of the tool spindle 20, however, even such a slight fitting clearance between the splines 23 of the spindle and the cooperating internal splines 29 formed in such a large, heavy member such as the flywheel 27 operate to create excessive vibration. This vibration is not only objectionable from the standpoint of noise, but also may cause damage to the finish of the work being operated upon by a cutter (not shown) mounted in the rotating tool spindle 20. To prevent such excessive vibration, as will be hereinafter more fully explained, the flywheel 27 and the spiral driving gear 28 are disposed to cooperate in such manner, when properly mounted on the tool spindle, as to lock both of these cooperating parts into tight, lash-free engagement with the external splines 23 formed on the spindle 20.

The forward portion of the flywheel 27 is provided with a forwardly extending circular portion 33 of reduced diameter constituting a circular mounting flange adapted to receive a ring gear 34 that is secured to the flywheel 27 by means of dowels 35 and cap screws 36. The flywheel 27, together with the ring gear 34 attached thereto, is adapted to constitute a low speed driving member for rotating the tool spindle 20 throughout a relatively low range of output speeds. Toward the front central face of the flywheel 27, there is provided a forwardly projecting, angularly converging, circular hub 37 of greatly reduced diameter adapted to be maintained in tight abutting engagement with the rearward face of the inner race of the front spindle bearing 19. At the opposite, or rearward end of the flywheel 27, there is provided a forwardly extending, inner circular pilot opening 39 adapted to receive a complementary forwardly extending circular hub 40 integrally formed with the cooperatively associated spindle driving gear 28.

To prevent backlash whenever the internally splined spindle driving assembly 26 is operatively assembled on the tool spindle 20, as shown in Fig. 2, the flywheel 27 is provided adjacent its rearward face with an inwardly recessed, internally formed spiral gear-like member 41 or spiral gear. Actually, the gear-like member 41 does constitute an internal spiral gear since it is provided with internal spiral gear teeth complementary to the external spiral gear teeth presented by the cooperatively associated high speed spindle driving gear 28. For this reason, the internal spiral gear-like member 41 is hereinafter referred to as an internal spiral gear. It will be apparent that the internal gear 41 may be formed integrally with the flywheel 27, as shown in the drawings, or formed as a separate part and fixedly secured to the rearward face of the flywheel 27 in such a manner as to constitute a unitary assembly. The internal spiral gear 41 is approximately one-fourth (¼) the width of the gear 28 in a manner that only the extreme forward portion of the gear teeth presented by the gear 28 are axially engageable with the cooperating spiral gear teeth formed on the internal gear 41. The internal teeth presented by the internal spiral gear 41 in the flywheel 27 are predeterminately located for axial engagement with the cooperating gear teeth presented by the spiral gear 28, whenever the flywheel 27 and gear 28 are moved into splined engagement with spindle splines 23. Thus, with the flywheel 27 positioned in splined engagement with the central portion of the tool spindle 20, the spiral gear 28 is axially movable in a forward direction in splined engagement with the tool spindle 20 until the spiral gear 28 meshingly engages the complementary internal spiral gear 41.

As the spiral gear 28 is urged axially forward into tight meshing engagement with the internal spiral gear 41, the helix angle on the cooperatively meshing spiral gear teeth is such as to effect a slight relative rotation of the flywheel 27 and the gear 28 in opposite directions relative to the tool spindle 20. In other words, the teeth presented by the internal spiral gear 41 are angularly formed to coact with the angular teeth of the external gear 28 in a manner to effect a slight relative rotation when moved into axial engagement. As more clearly shown in Fig. 1, the cooperating axial engagement of the spiral gear teeth operates to urge the flywheel 27 to rotate in a counterclockwise direction, and, simultaneously therewith, operates to urge the spiral gear 28 to rotate in a clockwise direction relative to the tool spindle 20. As a consequence, the leftward side faces 44 of the internal splines 29 formed in the flywheel 27 are urged into tight abutting engagement with the rightward side faces 45 on the splines 23 formed on the tool spindle 20. At the same time, the rightward side faces 46 of the splines 30 formed in the spiral gear 28 are urged into tight abutting engagement with the leftward side faces 47 of the cooperating splines 23 formed on the tool spindle 20.

To make it possible for axial engagement of the spiral gear 28 with the internal spiral gear 41 to effect the slight rotation of these members into locking engagement with the spindle 20, it is necessary to prevent movement of the gear 28 into endwise abutting engagement with the flywheel 27. To this end, the gear 28 and the flywheel 27 are so formed that clearance, as indicated at 48 and 49, is provided between the adjacent stepped end faces of the gear 28 and the flywheel 27. Sufficient clearance, 48 and 49, is provided to prevent movement of the gear 28 and flywheel 27 into endwise abutting engagement as the gear and flywheel are clamped to the spindle. Thus, rotational movement into locking engagement with the splines 23 of the tool spindle limits further slight rotational movement of the flywheel 27 and the gear 28 in opposite directions, and thereby prevents further axial forward movement of the gear 28. As this occurs, the entire spindle driving assembly 26, including the flywheel 27 and cooperating spiral gear 28, is secured in tight lash-free engagement with the splines 23 of the spindle 20.

To effect forward axial movement of the spiral gear 28 into tight meshing engagement with the internal spiral gear 41, as well as to lock these parts in axially adjusted position along the spindle, there is provided, as shown in Fig. 2, a locking apparatus or adjustable lock-nut 50 that is secured to the spindle 20 immediately adjacent the rear face of the gear 28. The locking apparatus 50 comprises an inner locking collar 51, and a lock-nut 52, both of which are provided on their outer periphery with serrations adapted to be engaged by the complementary internal serrations formed within an outer locking collar 53. To retain the outer collar 53 in locking engagement with the serrated inner collar 51 and locknut 52, as shown in Fig. 2, a snap ring 54 is removably engageable in well known manner with an annular groove formed in the periphery of the lock-nut 52. The inner locking collar 51 is provided with internal splines disposed to engage the extreme rearward ends of the splines 23 formed on the tool spindle 20, and the adjustable lock-nut 52 is provided with internal threads adapted to threadedly engage complementary threads 55 formed on the tool spindle 20.

Thus, during initial assembly, the bearing carrier 15, the spindle bearing 19, and the spindle drive assembly 26 are positioned on the tool spindle 20 as shown in Fig. 2. The inner locking element 51 is then moved into splined engagement with the rearwardly extending splines 23 formed on the tool spindle, and the lock-nut 52 is threaded along the threads 55 into abutting engagement with the inner collar 51. With the outer locking collar 53 positioned to engage only the peripheral serrations presented by the lock-nut 52, the lock-nut 52 is rotated along the spindle to urge the inner locking collar 51 and the spiral gear axially forward.

Forward rotational movement of the lock-nut 52 along the spindle 20 is continued until the inner race of the front spindle bearing 19 and the spindle drive assembly 26 are clamped in tight abutting engagement between the rearward face of the flange 21 formed on the spindle and the inner locking element 51. As soon as this occurs, the inner race of the front bearing 19 is in tight abutting engagement between the readward face of the spindle flange 21 and the forwardly extending hub 37 of the flywheel 27. Likewise, the spiral gear 28 is in tight axial meshing engagement with the internal spiral gear 41 formed in the flywheel 27, and the inner locking element 51 is in tight abutting engagement between the rearward face of the gear 28 and the lock-nut 52. With this condition existing, the locknut 52 is rotated sufficiently to move the external serrations presented thereby into axial alignment with the serrations formed on the outer periphery of the inner locking element 51. The outer locking collar 53 is then moved axially forward into engagement with the aligned serrations of the inner locking collar 51 and against the rearward face of gear 28. The snap ring 54 is then positioned in the annular groove presented by the lock-nut 52 for retaining outer locking collar 53 simultaneously in engagement with the serrations respectively formed on the inner locking collar 51 and the lock-nut 52.

After the locking apparatus 50 has been adjusted to complete the operative interconnection between the parts comprising the unitary spindle assembly 8, as shown in Fig. 2, it will be apparent that the adjacent end faces respectively presented by the flywheel 27 and the cooperatively associated spiral gear 28 are spaced apart slightly as indicated by the clearance 48 and 49 between these members as hereinbefore described.

Rearwardly of the threaded portion 55 of the tool spindle 20, there is provided a shoulder of reduced diameter adapted to receive the inner race of a middle spindle bearing 61. The outer flanged race of the bearing 61 is constrained against forward movement within a flanged circular opening 62 formed in the central or interior column wall 11. To retain the bearing 61 in proper position within the column wall 11, as well as to adjust both of the spindle bearings 19 and 61 for receiving combined axial and radial thrust loads, there is provided a locking apparatus 64 that is generally similar in construction to the locking apparatus 50 hereinbefore described. The locking apparatus 64 comprises an inner adjusting collar 65 that is keyed to the spindle 20 and moved into abutting engagement with the inner race of the bearing 61 by means of a lock-nut 66 threaded on the spindle. With the lock-nut 66 adjusted to maintain the bearings 19 and 61 in proper adjustment, an internally serrated outer locking collar 67 is positioned, as shown in Fig. 2, to engage complementary external serrations respectively formed on the periphery of the inner locking collar 65 and the lock-nut 66. A snap ring 68 is then positioned to engage an annular groove formed in the periphery of the lock-nut 66 for maintaining the locking apparatus 64 in predetermined adjusted position. For obtaining access to the locking apparatus 64, for selectively adjusting the spindle bearings 19 and 61 there is provided the usual opening formed in a side wall (not shown) of the hollow column 9.

To protect the spindle assembly 8 against the admission of coolant or metal chips, a dust shield 70 is secured within the forward portion of the circular flanged opening 14 formed in the front column wall 10 by means of cap screws 71 attached at their inner ends to the bearing carrier 15. The dust shield 70 is provided with a circular opening disposed to encircle the spindle flange 21 in a manner to prevent the admission of coolant into the hollow column 9. To this end, the dust shield is provided with an inner annular groove 72 that is operative in well known manner to cooperate with a pair of angularly formed, annular slinger rings formed on the periphery of the spindle flange 21. Likewise, the inner face of the dust shield is disposed to coact with an inner flanged recess formed in the bearing carrier 15 to constitute an annular groove 74 that coacts in well known manner with another pair of angularly formed slinger grooves formed in the periphery of the spindle flange 21 for retaining lubricant within the machine column 9.

Power for driving the tool spindle 20 is derived from a primary shaft 76 rotatably journalled within the column 9 in parallel spaced relationship to the tool spindle. The primary shaft 76 is operatively connected to be driven by a variable speed transmission mechanism and power source (not shown) as fully explained in the aforementioned U.S. Patent No. 2,497,842. The primary shaft 76 is provided with a splined forward end 77 and is rotatably supported by a pair of bearings 78, carried by the front column wall 10, and a spaced apart bearing 79, carried in the interior column wall 11. A spiral gear 82, journalled for rotation independently of the primary shaft 76, is disposed to be continuously maintained in meshing engagement with that portion of the high speed spindle driving gear 28 that is not engaged by the internal spiral gear 41 recessed into the rearward end of the flywheel 27. The spiral gear 82 is provided with a rearwardly extending hub that is supported for rotation by the inner races of a pair of spaced apart antifriction bearings 83 and 84, the outer races of which are secured within suitable bored openings formed in the interior column wall 11. The outer race of the bearing 84 is constrained against forward movement by the column wall 11 and is provided with a flanged race disposed to be engaged by the flanged end of a tubular sleeve 87 that is likewise constrained against forwardly movement. The flanged tubular sleeve 87 extends forward within the hub of the gear 82 in spaced apart concentric relationship to the shaft 76, and is threaded at its forward end within the hollow hub of the gear 82. To retain the tubular sleeve 87 in adjusted position, a locking sleeve 85 is inserted within the hub of the gear 82 in a manner that external serrations 86 formed on the periphery of the sleeve engage complementary serrations formed within the hub of the gear. At its inner end, the sleeve 85 is provided with clutch teeth 88 disposed to engage complementary clutch teeth formed on the inner end of the flanged tubular sleeve 87. To retain the locking sleeve in engagement with the tubular sleeve 87, a snap ring 89 is engaged within a groove formed within the hub of the gear 82. In this manner, the hub of the gear 82 is retained in position to be engaged by the inner races of the bearings 83 and 84.

Power is selectively transmitted from the shaft 76 for rotating the tool spindle 20 by means of a gear couplet 90 that is slidably splined on the splined forward end 77 of the primary shaft 76 for selective shiftable movement in either direction from the central neutral position in which it is shown in Fig. 2. To drive the tool spindle 20 throughout a high range of driving speeds, the couplet 90 is shifted rearwardly in a manner that a gear 91, integrally formed with the couplet, is moved into meshing engagement with a complementary internal gear 92 formed in the hub of the driving gear 82. For rotating the spindle 20 throughout a low range of driving speeds, the couplet 90 is shifted forwardly from its central position in a manner that a gear 93, integrally formed with the couplet, is moved into meshing engagement with the ring gear 34 that is secured to the flywheel 27. For effecting selective shiftable movement of the gear couplet 90, a shifting fork 95 engaging an annular groove in the couplet is operatively connected in well known manner to be actuated by a shifting mechanism (not shown).

The entire arrangement of the cooperating parts comprising the unitary tool spindle assembly 8, together with the openings 14 and 62 provided in the column walls 10 and 11, respectively, is disposed to facilitate removal of the tool spindle assembly from the supporting column 9 for inspection and repair. Likewise, this arrangement greatly simplifies the initial assembly of the tool spindle into the machine column 9, particularly in view of the fact that the large flywheel 27 is fixedly secured to the tool spindle in close proximity to the tool carrying end thereof. In order to remove the tool spindle assembly 8 from the column 9, for example, it is necessary first to disassemble a dust shield 96 and the bearings 78, at the forward end of the shaft 76 from the column. After this, the entire spindle assembly can be removed from the column by disassembling three principal parts. First, the circular dust shield 70 is removed from the circular opening 14 in the front column wall 10 by withdrawing the cap screws 71 extending into the bearing carrier 15. After the dust shield 70 has been removed, the locking apparatus 64 is disengaged from adjusted clamped position on the tool spindle 20 to permit forward axial movement of the central portion of the tool spindle 20 through the inner race of the center bearing 61. With the locking apparatus 64 disengaged from the spindle 20, it is necessary only to remove the cap screws 16 to permit forward bodily removal of the bearing carrier 15 together with the complete spindle assembly 8 from the supporting column 9.

After the complete unitary tool spindle assembly 8 has been removed from the column 9, the cooperating interconnected parts including the spiral gear 28, the flywheel 27, the front spindle bearing 19, and the bearing carrier 15 can be quickly disassembled from the tool spindle 20 by threadedly disengaging the single locking apparatus 50 secured thereto.

In a similar manner, the tool spindle assembly 8 can be reassembled, before it is repositioned within the column 9, by simply reassembling the bearing carrier 15, the bearing 19, and spindle driving assembly 26 to the tool spindle 20 after which the locking apparatus 50 is threadedly reengaged on the tool spindle 20 in properly adjusted position. Applying the locking apparatus 50 in properly adjusted position, as hereinbefore explained, operates to retain the various parts comprising the spindle assembly 8 in the required interconnected position, and, simultaneously therewith, operates to securely clamp the flywheel 27 and the spiral gear 28 in completely lash-free engagement with the central portion of the tool spindle 20.

The unitary tool spindle assembly 8 can then be repositioned within the column 9 with the spiral gear 28 in operatively meshing engagement with the gear 82 and the ring gear 34 positioned to be engaged by the shiftable gear couplet 90. The bearing carrier 15 is again secured within the opening 14 of the column wall 10 by means of the cap screws 16, and the single mounting apparatus 64 is reengaged on the tool spindle 20 to adjust the spindle bearings 19 and 61, after which the dust shield is replaced on the bearing carrier by means of the cap screws 71. Whenever the unitary spindle assembly 8 is removed from or repositioned within the column 9, it is unnecessary to disassemble the primary shaft 76 or any of the other driving mechanism (not shown) from the hollow supporting column 9.

It will be apparent, therefore, that the invention provides a greatly simplified and improved arrangement for assembling a tool spindle within a supporting machine column, as well as an improved backlash eliminator for fixedly securing a flywheel in lash-free engagement with a tool spindle in a position of close proximity to the tool receiving end of the spindle.

Although the illustrative embodiments of the invention have been described in detail in order to fully disclose the manner in which the invention may be practiced, it is to be understood that the particular apparatus set forth is intended to be illustrative only, and that the various novel features of the invention may be incorporated in other structural forms without departing from the spirit and scope of the invention, as defined in the subjoined claims.

The principles of this invention having now been fully explained in connection with the foregoing description, we hereby claim as our invention:

1. In a machine tool; a frame provided with a front wall having an enlarged opening and a rearwardly spaced wall having a smaller opening aligned with the opening in said front wall; a tool spindle assembly comprising a bearing carrier removably secured within the enlarged opening in said front column wall and being in turn provided with a flanged circular opening, an antifriction spindle bearing constrained against rearward movement within the opening formed in said bearing carrier, a tool spindle having a flanged forward end and a splined inner portion extending rearwardly through the inner race of said spindle bearing, a flywheel removably splined to said spindle rearwardly of said bearing, said flywheel being provided adjacent its outer rearward face with an internally formed spiral gear-like member concentric to the splined opening extending therethrough, an internally splined spiral gear having externally formed gear teeth and being removably splined to said spindle in meshing engagement with the internal spiral gear-like member formed in said flywheel, a lock-nut threadedly engaging said spindle adapted to retain the inner face of said spindle flange, the inner race of said bearing, said flywheel and said spiral gear in tightly cooperating engagement whereby said flywheel and said spiral gear are rotatably urged into clamping engagement with the splined portion of said spindle; a second bearing constrained against forward movement within the opening formed in said rearwardly spaced column wall; and a second lock-nut threadedly engaging said spindle and being adjustably movable into abutting engagement with said bearing whereby said tool spindle assembly is removable from said column as a single unit after said second lock-nut is disengaged from said spindle and said bearing carrier is removed from said front column wall.

2. In a backlash eliminator, a rotatably journalled splined shaft, a pair of internally splined driving members positioned on said splined shaft in adjacent relationship, said driving members being respectively provided with external spiral gear teeth and complementary internal spiral gear teeth adapted to be moved into meshing engagement as said members are axially moved toward one another along said splined shaft, actuating means associated with said splined shaft adapted to move said members axially toward one another along said splined shaft in a manner that the said spiral teeth respectively carried thereby are urged into tight meshing engagement to tend to rotate said members in opposite directions relative to said shaft whereby said internally splined members are rigidly clamped to said splined shaft.

3. In a machine tool, a column, a tool spindle journalled in said column, said tool spindle being provided with longitudinally extending driving splines, a pair of internally splined driving members removably positionable in adjacent relationship on said tool spindle to engage the splines thereon, the first of said members being provided on its periphery with spiral gear teeth to constitute a relatively wide spiral gear, the second of said driving members being provided adjacent one end face with complementary internal spiral gear teeth to constitute an internal spiral gear like member approximately one-fourth the width of the spiral teeth on said associated driving member, said second driving member being provided on its periphery with external gear teeth, clamping means associated with said spindle operative to urge said driving members axially toward each other along said spindle to retain the complementary spiral gear teeth in tight axially meshing engagement, said driving members being urged to rotate in opposite directions by the meshing engagement of the spiral gear teeth formed therewith to retain the internal splines thereof in tight lash-free engagement with the splines presented by said spindle, a driving spiral gear disposed to meshingly engage the spiral gear teeth formed on the first of said members, and shiftably engageable power operable means selectively operable to transmit power for rotating said driving spiral gear or the said second of said driving members to transmit power for rotating one or another of said driving members to drive said tool spindle at a selected speed.

4. In a backlash eliminator, an externally splined shaft provided with a threaded portion, a pair of internally splined driving members removably positionable to engage said splined shaft in adjacent relationship, an abutment wall member associated with said shaft adapted to restrain said members against endwise axial movement in one direction, one of said driving members being provided with externally formed spiral gear teeth, the other of said members being provided with internally formed spiral gear teeth disposed to meshingly engage the external spiral gear teeth on the adjacently positioned one of said members, said members being so formed that clearance is provided between the inner adjacent faces thereof whenever the cooperating spiral gear teeth are in tight meshing engagement, and a releasable lock-nut threaded on said spindle adapted to urge said members axially toward each other in opposition to said abutment member into tight meshing engagement, whereby the cooperatively meshing spiral gear teeth operate to urge said members to rotate in opposite directions for retaining the internal splines formed therein in tight clamping engagement with the external splines on said shaft.

5. In a backlash eliminator for a machine tool, a rotatably journalled splined shaft, a power transmitting driving member comprising a pair of internally splined driving elements splined to said shaft in axially spaced relationship, one of said elements being provided with external gear teeth formed angularly to a plane passing through the rotational axis thereof, the other of said elements being provided adjacent one end face with internal angularly formed gear teeth adapted to mesh with said external angularly formed gear teeth on said associated element, means associated with said shaft connected to urge said elements axially toward each other along said splined shaft to move said cooperating angularly formed teeth into tight meshing engagement, said elements being actuated to turn by the axial engagement of said cooperating angularly formed gear teeth in a manner to clamp said elements into lash-free engagement with said splined shaft, and power operable means selectively connectable to rotate said driving member for rotatably driving said splined shaft.

6. In a machine tool, an externally splined rotatably journalled tool spindle, a pair of internally splined driving gears cooperatively associated in adjacent splined engagement with said tool spindle, the first one of said driving gears being provided on its periphery with external spiral gear teeth, the second of said driving gears being provided with external gear teeth and being considerably larger in diameter than said first driving gear to provide a different driving ratio, said second driving gear being provided adjacent one of its end faces with internal spiral gear teeth complementary to the spiral teeth of said first driving gear, said internal spiral gear teeth being approximately one-fourth the width of said external spiral gear teeth, actuating means associated with said tool spindle connected to urge said external spiral driving gear teeth axially into tight meshing engagement with said internal spiral gear teeth presented adjacent an end face of said second associated large diameter driving gear, said driving gears being urged by the cooperating spiral gear teeth presented thereby to turn in opposite directions in a manner that the internally splined portions thereof are urged into tight lash-free engagement with the external splines on said spindle, a spiral gear operatively connected to engage that portion of the teeth of said external spiral gear teeth that are not engaged by said internal spiral gear teeth, and power driven means including a selectively shiftable gear couplet that is selectively engageable to transmit power for driving said spiral gear or said large diameter spindle driving gear whereby said spindle is connected to be rotatably driven at a selected range of output speeds.

7. In a machine tool, a hollow supporting column having a wall presenting an enlarged flanged opening, a spindle bearing carrier provided with a flanged circular opening and being removably secured within the opening in said column wall, an antifriction bearing having its outer race constrained by the flanged opening in said carrier against rearward movement, a tool spindle having a flanged forward end extending through the inner race of said bearing and extending rearwardly into said column, said spindle being provided with longitudinally extending external splines rearwardly of said bearing, an internally splined flywheel positionable on the splined portion of said spindle and being formed with large spindle driving gear teeth, said flywheel being provided adjacent its inner rearward face with an enlarged circular opening presenting internally formed spiral gear teeth, a spiral driving gear provided with an internally splined bored opening, said spiral gear being removably positionable upon the splined portion of said spindle in a manner that the external teeth presented thereby engage the internal spiral teeth formed in said flywheel, a lock-nut removably secured to said spindle disposed to retain said spiral gear, said flywheel and the inner race of said bearing in tightly interconnected engagement, and a second bearing carried by said column disposed to rotatably support the central rearward portion of said spindle.

8. In a machine tool; a hollow supporting column having a front wall provided with an enlarged opening and a rearwardly spaced interior wall provided with a smaller opening; a tool spindle assembly comprising a bearing carrier removably secured within the enlarged opening provided in the front wall of said column, a first antifriction bearing supported by said carrier and having its outer race constrained thereby against rearward movement, a tool spindle rotatably supported at its forward end by said bearing and extending rearwardly therethrough into the interior of said column, said spindle being provided at its forward end with a flange engaging the front face of the inner race of said bearing in a manner that said bearing carrier constrains said spindle against rearward movement, a gear driving assembly removably splined to said spindle rearwardly of said bearing, a lock-nut threaded on said spindle adapted to retain said gear driving assembly in abutting engagement with the inner race of said bearing; selectively engageable power operable means connected to rotate said gear driving assembly for driving said spindle; a second antifriction bearing having its outer race constrained against forward movement in the opening in said interior column wall, said second bearing having its inner race encircling said spindle to cooperate with said first bearing for rotatably supporting said spindle assembly; and a second lock-nut threaded on said spindle into abutting engagement with the rearward face of the inner race of said second bearing, whereby said spindle assembly is removable from said column as a single unit by disengaging said second lock-nut from said spindle and disengaging said bearing carrier from said front column wall.

9. In a unitary machine tool spindle assembly, a tool spindle presenting longitudinally formed external splines and a threaded portion rearwardly of the splines, a flywheel presenting complementary internal splines removably positionable on the splined portion of said spindle, said flywheel being provided adjacent one side face with an internal spiral gear-like member concentric with the internally splined opening extending therethrough, abutment means associated with said spindle in a manner to engage the opposite face of said flywheel to restrain it against forward movement, an external spiral gear having teeth complementary to the internal spiral gear-like member formed in said flywheel and being provided with a concentrically formed bored opening presenting splines complementary to the external splines formed on said spindle, said spiral gear being removably positionable on the splined portion of said spindle in a manner that the spiral gear teeth presented thereby are in meshing engagement with the internal spiral gear-like member formed in said flywheel, and a releasable clamp nut threaded on said spindle adapted to urge said spiral gear axially toward said flywheel in a manner that the coaction between the internal spiral gear-like member formed in said flywheel and the cooperatively intermeshing teeth of said external spiral gear effect a slight relative rotation therebetween to urge the internal splines respectively presented thereby into clamping engagement with the external splines presented by said spindle.

10. In a machine tool; an upstanding hollow column provided with a front wall and a spaced apart interior wall substantially parallel to said front wall, said front column wall and said interior column wall being provided with axially aligned openings extending therethrough; a tool spindle assembly removably carried by said column and comprising a bearing carrier removably secured within the opening provided in said front column wall, a bearing mounted in said carrier having its outer race constrained against rearward movement, a tool spindle extending through the inner race of said bearing, said spindle having a flanged forward end disposed to abut the forward face of the inner race of said bearing, and a driving member secured to said spindle rearwardly of said bearing; a second bearing having its outer race constrained within the opening formed in said interior column wall against forward movement, the inner race of said second bearing being operative to rotatably support the central portion of said tool spindle rearwardly of said driving member; and a lock-nut removably secured to said spindle rearwardly of said interior column wall for adjustable movement into abutting engagement with the rearward face of the inner race of said second spindle bearing, said lock-nut being operative to preload both of said spindle supporting bearings, whereby said entire tool spindle assembly can be withdrawn through the opening in said front column wall as a single unit by removing said carrier from said front wall and said second lock-nut from said spindle.

References Cited in the file of this patent

UNITED STATES PATENTS

| | | |
|---|---|---|
| 2,302,575 | Romaine et al. | Nov. 17, 1942 |
| 2,429,067 | McDonald | Oct. 14, 1947 |
| 2,597,716 | Eserkaln | May 20, 1952 |